US011131281B2

(12) United States Patent
Lassesson

(10) Patent No.: US 11,131,281 B2
(45) Date of Patent: Sep. 28, 2021

(54) METHOD FOR CONTROLLING A FUEL TANK ARRANGEMENT

(71) Applicant: Volvo Truck Corporation, Gothenburg (SE)

(72) Inventor: Bengt Lassesson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 41 days.

(21) Appl. No.: 16/624,828

(22) PCT Filed: Jun. 22, 2017

(86) PCT No.: PCT/EP2017/065400
§ 371 (c)(1),
(2) Date: Dec. 19, 2019

(87) PCT Pub. No.: WO2018/233830
PCT Pub. Date: Dec. 27, 2018

(65) Prior Publication Data
US 2020/0171937 A1    Jun. 4, 2020

(51) Int. Cl.
*B60K 15/03* (2006.01)
*F02M 37/00* (2006.01)

(52) U.S. Cl.
CPC ......... *F02M 37/0088* (2013.01); *B60K 15/03* (2013.01); *F02M 37/0023* (2013.01); *F02M 37/0052* (2013.01); *B60K 2015/0319* (2013.01); *B60K 2015/0348* (2013.01); *B60K 2015/03118* (2013.01); *B60K 2015/03125* (2013.01); *B60K 2015/03217* (2013.01); *Y10T 137/4673* (2015.04); *Y10T 137/479* (2015.04);
(Continued)

(58) Field of Classification Search
CPC .......... F02M 37/0088; F02M 37/0023; B60K 2015/03118; B60K 2015/03125; Y10T 137/4857; Y10T 137/4673; Y10T 137/4807; Y10T 137/479; Y10T 137/4874
See application file for complete search history.

(56) References Cited

U.S. PATENT DOCUMENTS 5,163,466 A   11/1992  Moody
5,197,443 A    3/1993  Hodgkins
(Continued)

FOREIGN PATENT DOCUMENTS

CN    102245421 A    11/2011
CN    103269892 A     8/2013
(Continued)

OTHER PUBLICATIONS

International Search Report and Written Opinion for International Patent Application No. PCT/EP2017/065400, dated Mar. 1, 2018, 11 pages.
(Continued)

*Primary Examiner* — Atif H Chaudry
(74) *Attorney, Agent, or Firm* — Withrow & Terranova, PLLC

(57) ABSTRACT

The present invention relates to a method for controlling a fuel tank arrangement (100) connected to a prime mover (101) for propulsion of a vehicle. More particularly, the fuel tank arrangement (100) comprises a first (102) and a second (104) fuel tank connected to the prime mover of the vehicle.

18 Claims, 3 Drawing Sheets

(52) U.S. Cl.
CPC .... *Y10T 137/4807* (2015.04); *Y10T 137/4857* (2015.04); *Y10T 137/4874* (2015.04)

(56) References Cited

U.S. PATENT DOCUMENTS

| | | | |
|---|---|---|---|
| 7,111,809 B1* | 9/2006 | Tai | B64C 1/1453 |
| | | | 244/135 R |
| 2005/0224057 A1* | 10/2005 | Tokumaru | F02M 21/0212 |
| | | | 123/516 |
| 2006/0042606 A1 | 3/2006 | Van Dyke | |
| 2012/0041665 A1* | 2/2012 | Pursifull | F02D 41/3029 |
| | | | 701/103 |
| 2014/0114511 A1 | 4/2014 | Sangameswaran et al. | |
| 2014/0202420 A1* | 7/2014 | Jaasma | F02D 19/0684 |
| | | | 123/304 |
| 2015/0300287 A1* | 10/2015 | Ulrey | F02D 41/3845 |
| | | | 701/103 |
| 2016/0245244 A1* | 8/2016 | Katsura | F02D 19/027 |
| 2017/0030524 A1 | 2/2017 | Tilander | |

FOREIGN PATENT DOCUMENTS

| | | |
|---|---|---|
| CN | 104220741 A | 12/2014 |
| CN | 105637211 A | 6/2016 |
| CN | 106460740 A | 2/2017 |
| EP | 1850060 A1 | 10/2007 |
| EP | 2679430 A1 | 1/2014 |
| FR | 2713996 A1 | 6/1995 |

OTHER PUBLICATIONS

First Office Action for Chinese Patent Application No. 201780092208.2, dated Feb. 10, 2021, 10 pages.

* cited by examiner

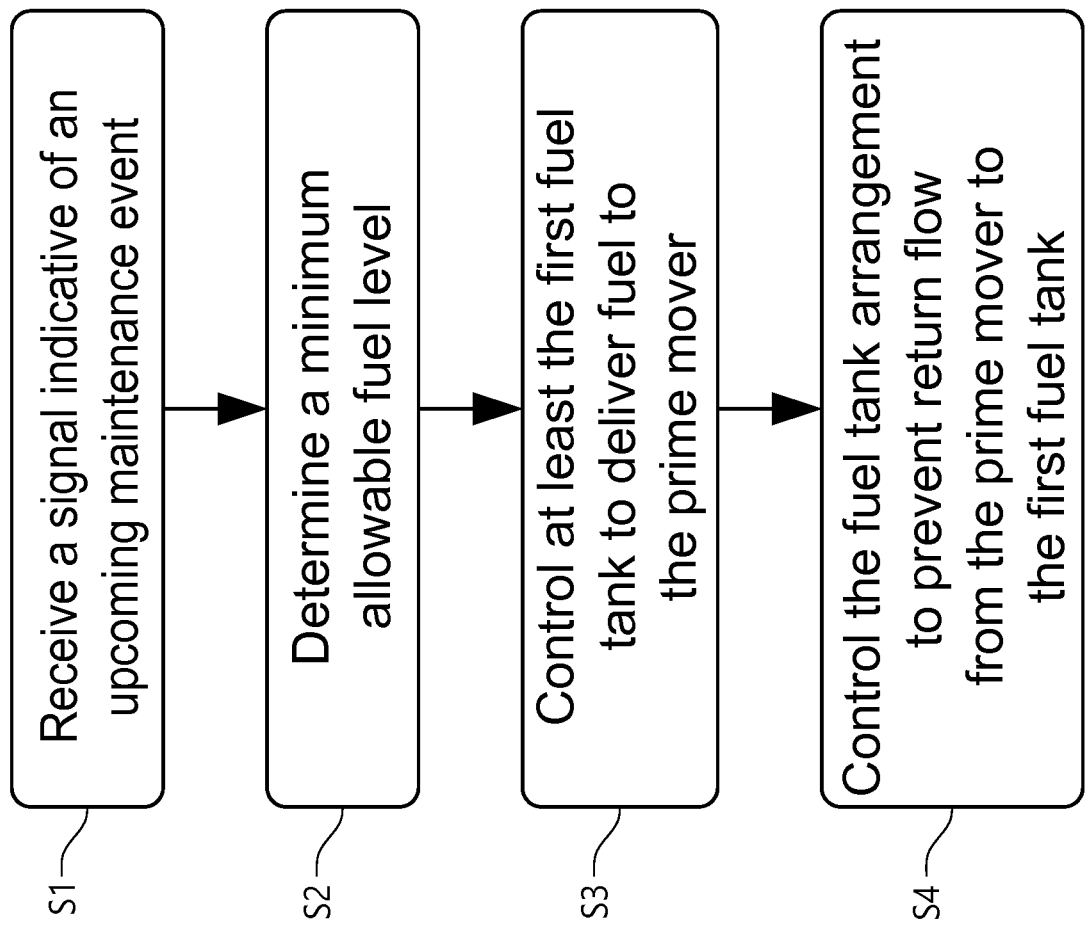

METHOD FOR CONTROLLING A FUEL TANK ARRANGEMENT

This application is a 35 USC 371 national phase filing of International Application No. PCT/EP2017/065400, filed Jun. 22, 2017, the disclosure of which is incorporated herein by reference in its entirety.

TECHNICAL FIELD

The present invention relates to a method for controlling a fuel tank arrangement. The invention also relates to a corresponding fuel tank arrangement. The invention is applicable on vehicles, in particularly low, medium and heavy duty vehicles commonly referred to as trucks. Although the invention will mainly be described in relation to a truck, it may also be applicable for other type of vehicles provided with at least two fuel tanks.

BACKGROUND

In connection to low-, medium and heavy duty vehicles, also commonly referred to as trucks, a fuel tank arrangement comprising fuel tanks are provided for containing the fuel used by the prime mover of the vehicle. It is also common to use more than one fuel tank, i.e. multiple fuel tanks, for increasing the available fuel capacity of the vehicle as well as e.g. providing a balance in fuel volume between the left and right hand side of the vehicle.

The fuel tank arrangement is also often provided with fuel pump(s) for delivery of fuel to the vehicle engine, etc. Thus, regular maintenance of the fuel tank arrangement is often required to maintain sufficient functionality and operation of the fuel tank and its associated components.

Before providing maintenance to the fuel tank arrangement, the fuel tank arrangement should preferably be emptied of fuel. The fuel in the fuel tank should thus, prior to a maintenance event, be evacuated from the fuel tank. This can be made by means of draining the fuel to a storage tank or burning the fuel.

US 2017/0030524 describes a fuel tank arrangement and a tool for draining and refilling a vehicle tank. The tool comprises a portable storage tank which is connected to the fuel tank at the service station. Hereby, the fuel in the fuel tank can be drained to the storage tank before maintenance thereof. However, there is a desire to be able to sufficiently drain the fuel tank without the use of a separate storage tank for these situations.

SUMMARY

It is an object of the present invention to provide a method for controlling a fuel tank arrangement which at least partially overcomes the above described deficiencies. This is achieved by a method according to claim 1.

According to a first aspect of the present invention, there is provided a method for controlling a fuel tank arrangement connected to a prime mover for propulsion of a vehicle, wherein the fuel tank arrangement comprises a first and a second fuel tank, the first and second fuel tanks being connected to the prime mover of the vehicle for delivery of fuel to the prime mover and for receiving return flow from the prime mover, wherein the method comprises the steps of receiving a signal indicative of an upcoming maintenance event for the first fuel tank; determining a minimum allowable fuel level within the first fuel tank; if the fuel level in the first fuel tank is above said minimum allowable fuel level: controlling at least the first fuel tank to deliver fuel to the prime mover; and controlling the fuel tank arrangement to prevent return flow from the prime mover to the first fuel tank.

The wording "maintenance event" should be understood to mean a planned service occasion for the first fuel tank. The upcoming maintenance event can be based on regular service intervals which are set for the specific fuel tank and its associated components. The regular service interval can, for example, be time based, i.e. based on a specific interval, such as e.g. the number of months/days since the previous maintenance event took place, or based on the number of kilometers driven since the previous maintenance event. The signal indicative of the upcoming maintenance event may thus, for example, be based on one of the above service intervals. The maintenance event may also be determined based on a receiving a signal from an operator. When it is determined that the first fuel tank should be exposed to a maintenance event, the vehicle is put in "service mode".

An advantage is thus that a minimum volume of fuel will be present in the first fuel tank when the vehicle arrives at the service station. Hereby, a reduced volume of fuel needs to be evacuated from the first fuel tank that will be provided for maintenance. However, enough fuel may be provided for being able to sufficiently propel the prime mover in case of e.g. the second fuel tank being unable to deliver fuel to the prime mover, or unable to provide sufficient amount of fuel required by the prime mover.

Thus, a dual technical effect of the above method is provided. Furthermore, while preventing return flow from the prime mover to the first fuel tank, delivery of fuel from the second tank to the prime mover may also be prevented to ensure that the first fuel tank will be kept at a sufficiently low fuel level until the vehicle arrives at the service station. The fuel level in the first fuel tank will thus be continuously kept at a low level as possible when the vehicle is put in "service mode".

According to an example embodiment, the method may further comprise the steps of determining that the fuel level in the first fuel tank is below the minimum allowable fuel level; and controlling the fuel tank arrangement to allow return flow from the prime mover to the first fuel tank until the fuel level in the first fuel tank exceeds the minimum allowable fuel level. Hereby, if it is determined that the fuel level within the first fuel tank is too low, return flow to the first fuel tank is allowable for a period of time for being able to sufficiently propel the vehicle.

According to an example embodiment, the method may further comprise the steps of determining a maximum allowable fuel level within the second fuel tank; and controlling the fuel tank arrangement to allow return flow from the prime mover to the first fuel tank until the fuel level in the second fuel tank falls below the maximum allowable fuel level. An advantage is that over filling of the second fuel tank is avoided.

According to an example embodiment, the method may further comprise the step of controlling the second fuel tank to deliver fuel to the prime mover. Hereby, if the fuel level in the first fuel tank is insufficient for propelling the vehicle to the service station, the prime mover may be propelled by means of the fuel in the second fuel tank. The second fuel tank will thus act as the primary fuel tank for delivery of fuel to the prime mover. In case the prime mover requires, fuel may be provided from both the first and second fuel tanks.

According to an example embodiment, the first and second fuel tanks may comprise a respective first and second fuel pump for providing fuel to the prime mover, wherein the method further comprises the steps of determining a fuel level within the first fuel tank; comparing the fuel level with the minimum allowable fuel level; and controlling the pump power of the first fuel pump based on a difference between the fuel level in the first fuel tank and the minimum allowable fuel level.

Hereby, the first fuel pump may be able to adaptively adjust its pumping power based on the difference between the fuel level in the first fuel tank and the minimum allowable fuel level and/or a distance to the service station for the maintenance event. Thus, if it is suddenly determined that the fuel level within the first fuel tank is too high, the pump power may be temporarily increased to reduce the fuel level. Likewise, if it is determined that the fuel level is too low to propel the vehicle to the service station, the pump power may be reduced for a period of time to reduce the fuel consumption of the first fuel tank. When the pump power of the first fuel pump is reduced, the pump power of the second fuel pump is preferably increased, and vice versa, in order to maintain sufficient power of the prime mover.

According to an example embodiment, the minimum allowable fuel level may be based on a fuel level sufficient to maintain drivability of the prime mover for a first period of time. Hereby, if e.g. the second fuel tank is unable to deliver fuel to the prime mover, the fuel level in the first fuel tank is sufficient for propelling the vehicle to e.g. a tank station or for sufficiently arriving at the service station. Furthermore, if the second fuel pump is operating at its maximum capacity and the prime mover requires further fuel to be sufficiently operated, the first fuel pump may be controlled to deliver the additional fuel required by the prime mover. Hereby, fuel pump with relatively low capacity can be used as they are able to operate in conjunction with each other.

According to an example embodiment, the minimum allowable fuel level may be based on a distance to a service station for the maintenance event.

According to an example embodiment, the step of determining the minimum allowable fuel level within the first tank may comprise the steps of determining a distance to the service station; determining a volume of fuel for propelling the vehicle to the service station; and setting the volume of fuel as the minimum allowable fuel level within the first fuel tank. Hereby, the vehicle will be able to be propelled to the service station by means of the fuel in the first fuel tank.

According to an example embodiment, the step of controlling the pump power of the first fuel pump may be further based on the distance to the service station for the maintenance event.

According to an example embodiment, the fuel tank arrangement may further comprise a first fuel conduit arranged between the first fuel tank and the prime mover, the first fuel conduit being connected to a first fuel pump, wherein the step of controlling at least the first fuel tank to deliver fuel to the prime mover comprises the step of controlling the first fuel pump to deliver fuel from the first fuel tank to the prime mover.

According to an example embodiment, the fuel tank arrangement may further comprise a first return conduit arranged between the prime mover and the first fuel tank, the first return conduit comprising a first return valve controllable between an opened position and a closed position for controlling return flow into the first fuel tank.

According to a second aspect of the present invention, there is provided a fuel tank arrangement for a vehicle, the fuel tank arrangement comprising a first and a second fuel tank connectable to a prime mover of the vehicle, a first fuel conduit connectable between the first fuel tank and the prime mover, wherein the first fuel conduit comprises a first fuel pump; a first return conduit connectable between prime mover and the first fuel tank, wherein the first return conduit comprises a first return valve; and a control unit connected to the first fuel pump and the first return valve, wherein the control unit is configured to receive a signal indicative of an upcoming maintenance event for the first fuel tank; determine a fuel level within the first fuel tank; determine a minimum allowable fuel level within the first fuel tank; if the fuel level in the first fuel tank is above said minimum allowable fuel level: control the first fuel pump to deliver fuel from the first fuel tank to the prime mover; and control the return valve to be positioned in a closed state for preventing return flow from the prime mover to the first fuel tank.

According to an example embodiment, the fuel tank arrangement may further comprise a second fuel conduit connectable between the second fuel tank and the prime mover, wherein the second fuel conduit comprises a second fuel pump, and a second return conduit connectable between the prime mover and the second fuel tank, wherein the second return conduit comprises a second return valve, wherein the control unit is further connected to the second fuel pump and the second return valve.

Effects and features of the second aspect are largely analogous to those described above in relation to the first aspect.

According to a third aspect, there is provided a computer program comprising program code means for performing any of the steps described above in relation to the first aspect when the program is run on a computer.

According to a fourth aspect, there is provided a computer readable medium carrying a computer program comprising program means for performing any of the steps described above in relation to the first aspect when the program means is run on a computer.

Effects and features of the third and fourth aspects are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 3 is a flow chart of a method for controlling the fuel tank arrangement in FIG. 2 according to an example embodiment.

DETAILED DESCRIPTION OF EXAMPLE EMBODIMENTS OF THE INVENTION

Figure 1:
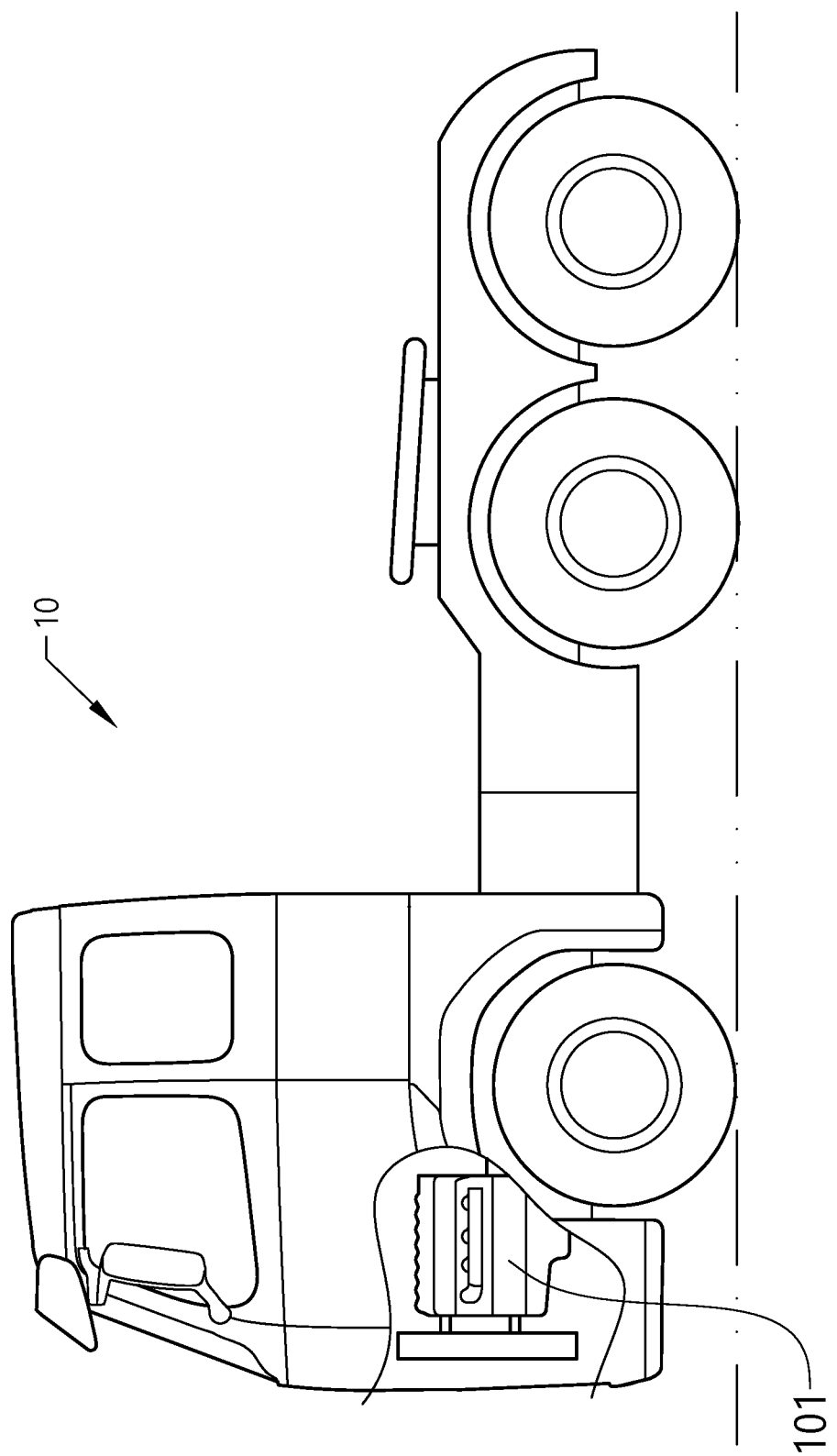
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 101 in the form of an internal combustion engine. The prime mover 101 may be a dual fuel internal combustion engine propelled by e.g. a conventional fuel such as diesel or petrol, and by a combustible gas. The prime mover 101 is furthermore connected to a fuel tank arrangement (see FIG. 2) which comprises at least one fuel tank comprising fuel for propelling the prime mover 101. The fuel in the fuel tanks may, for example, be a gaseous fuel such as e.g. DME. Other alternatives are of course conceivable, such as e.g. a cryotank, a diesel tank, etc.

Figure 2:
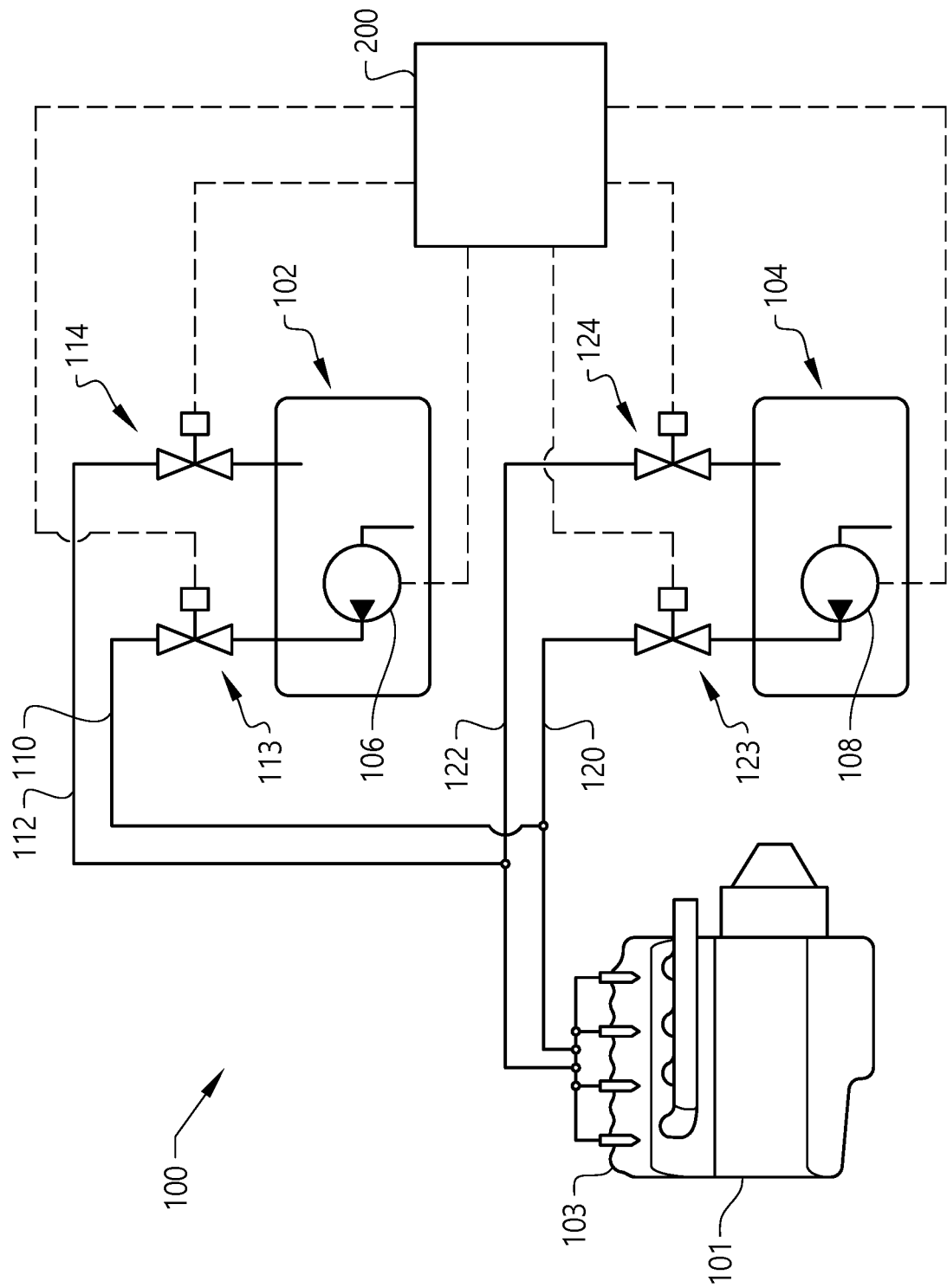
FIG. 2 is a schematic illustration of a fuel tank arrangement according to an example embodiment of the present invention.

With reference to FIG. 2, a fuel tank arrangement 100 according to an example embodiment is depicted. As can be seen, the fuel tank arrangement 100 comprises a first fuel tank 102 and a second fuel tank 104. Both the first 102 and second 104 fuel tanks comprises a combustible fuel for propelling the prime mover 101. Hence, both the first 102 and second 104 fuel tanks are arranged in fluid communication with the prime mover 101. In more detail, the first 102 and second 104 fuel tanks are arranged in fluid communication with a fuel injection system 103 of the prime mover 101.

The following will describe the connection between the first fuel tank 102 and the prime mover 101, as well as the connection between the second fuel tank 104 and the prime mover 101. The first fuel tank 102 is arranged in fluid communication with the prime mover 101 by means of a first fuel conduit 110. Hereby, fuel from the first fuel tank 102 can be delivered to the prime mover 101 via the first fuel conduit 110. The first fuel conduit 110 also comprises a first fuel pump 106 for providing the fuel from the first fuel tank 102 to the prime mover 101. Moreover, the first fuel conduit 110 comprises a first fuel valve 113. The first fuel valve 113 is preferably an electronically controlled valve. Other alternatives are also conceivable, such as a pneumatically controlled valve, a hydraulically controlled valve, etc. The first fuel valve 113 is preferably remotely controlled by means of the below described control unit 200.

Furthermore, the fuel tank arrangement 100 further comprises a first return conduit 112 arranged in fluid communication between the prime mover 101 and the first fuel tank 102. By means of the first return conduit 112, return flow from the prime mover 101 is allowed to be delivered to the first fuel tank 102. The first return conduit 112 is provided with a first return valve 114 for controllably delivery of return flow from the prime mover 101 to the first fuel tank 102. The first return valve 114 is preferably an electronically controlled valve. Other alternatives are also conceivable, such as a pneumatically controlled valve, a hydraulically controlled valve, etc. The first return valve 114 is preferably remotely controlled by means of the below described control unit 200.

The second fuel tank 104 is arranged in fluid communication with the prime mover 101 by means of a second fuel conduit 120. Hereby, fuel from the second fuel tank 104 can be delivered to the prime mover 101 via the second fuel conduit 120. The second fuel conduit 120 also comprises a second fuel pump 108 for sufficiently providing the fuel from the second fuel tank 104 to the prime mover 101. Moreover, the second fuel conduit 120 comprises a second fuel valve 123. The second fuel valve 123 is preferably an electronically controlled valve. The second fuel valve 123 is preferably remotely controlled by means of the below described control unit 200.

Furthermore, the fuel tank arrangement 100 further comprises a second return conduit 122 arranged in fluid communication between the prime mover 101 and the second fuel tank 104. By means of the second return conduit 122, return flow from the prime mover 101 is allowed to be delivered to the second fuel tank 104. The second return conduit 122 is provided with a second return valve 124 for controllably delivery of return flow from the prime mover 101 to the second fuel tank 104. The second return valve 124 is preferably an electronically controlled valve. The second return valve 124 is preferably remotely controlled by means of the below described control unit 200.

As is further depicted in FIG. 2, the fuel tank arrangement 100 also comprises a control unit 200. The control unit 200 may be connected to each of the first fuel valve 113, the first return valve 114, the first fuel pump 106, the second fuel valve 123, the second return valve 124 and the second fuel pump 108. The control unit 200 may thus control the first fuel valve 113 to be arranged between an opened and closed position, to control the first return valve 114 to be arranged between an opened and closed position and to control the pump power of the first fuel pump 106. Likewise, control unit 200 may control the second fuel valve 123 to be arranged between an opened and closed position, to control the second return valve 124 to be arranged between an opened and closed position and to control the pump power of the second fuel pump 108.

The control unit 200 may include a microprocessor, microcontroller, programmable digital signal processor or another programmable device. Thus, the control unit 200 comprises electronic circuits and connections (not shown) as well as processing circuitry (not shown) such that the control unit 200 can communicate with different parts of the vehicle 10 such as the above described components of the fuel tank arrangement 100. The control unit 200 may comprise modules in either hardware or software, or partially in hardware or software and communicate using known transmission buses such as CAN-bus and/or wireless communication capabilities. The processing circuitry may be a general purpose processor or a specific processor. The control unit 200 comprises a non-transitory memory for storing computer program code and data upon. Thus, the skilled addressee realizes that the control unit 200 may be embodied by many different constructions.

The description above in relation to FIGS. 1 and 2 has mainly been focused on the structural components of the fuel tank arrangement 100. Reference is therefore made to FIG. 3, in combination with FIG. 2 in order to describe the functionality and method for controlling the fuel tank arrangement 100 according to an example embodiment.

Firstly, when it is time for maintenance of the first fuel tank 102, a signal indicative of the upcoming maintenance event is received S1. Hereby, it can be determined that the first fuel tank should be provided in a maintenance/service mode, where the fuel level should be kept as low as possible until arriving at the service station executing the maintenance. The fuel level should hereby preferably be at such levels that the first fuel pump 106 is able to pump fuel to the prime mover 101. According to an example, the distance to the service station where the maintenance event is to take place may be determined. A minimum allowable fuel level within the first fuel tank 102 is thus here determined S2, which minimum allowable fuel level is based on an amount of fuel that is able to propel the prime mover in case of e.g. the second fuel tank is unable to supply fuel to the prime mover, or that the second fuel pump of the second fuel tank is unable to provide required amount of fuel to the prime mover. The minimum allowable fuel level within the first fuel tank 102 may thus be based on a fuel level which can sufficiently maintain drivability of the prime mover for a period of time e.g. until the second fuel tank is able to sufficiently deliver fuel to the prime mover. Hence, the fuel level is such that the fuel pump is able to pump fuel to the prime mover. In order to reduce the fuel level within the first fuel tank 102, the control unit 200 controls S3 the first fuel tank 102 to deliver fuel to the prime mover 101. In detail, the control unit 200 controls the first fuel pump 106 to pump fuel from the first fuel tank 102 and controls the first fuel valve 113 to be arranged in the opened position. Furthermore, if the fuel level in the first fuel tank 102 is above the minimum allowable fuel level, the control unit 200 controls S4 the fuel tank arrangement 100 to prevent return flow from the prime mover 101 to the first fuel tank 102. In detail, the control unit 200 controls the first return valve 114 to be arranged in a closed position.

Moreover, if it is determined that the fuel level in the first fuel tank 102 is below the minimum allowable fuel level, the control unit 200 controls the fuel tank arrangement 100 to allow return flow from the prime mover 101 to the first fuel tank 102 until the fuel level in the first fuel tank has exceeded the minimum allowable fuel level again. Return from the prime mover 101 to the first fuel tank 102 may also be allowed if the fuel level in the second fuel tank 104 is above a maximum allowable fuel level in order to prevent over filling of the second fuel tank 104. The maximum allowable fuel level may, for example, be based on legislation levels.

The control unit 200 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for controlling a fuel tank arrangement connected to a prime mover for propulsion of a vehicle, wherein the fuel tank arrangement comprises a first and a second fuel tank, the first and second fuel tanks being connected to the prime mover of the vehicle for delivery of fuel to the prime mover and for receiving return flow from the prime mover, wherein the method comprises the steps of:
    receiving a signal indicative of an upcoming maintenance event for the first fuel tank;
    determining a minimum allowable fuel level within the first fuel tank;
    if the fuel level in the first fuel tank is above the minimum allowable fuel level:
        controlling at least the first fuel tank to deliver fuel to the prime mover; and
        controlling the fuel tank arrangement to prevent return flow from the prime mover to the first fuel tank.

2. The method according to claim 1, further comprising the steps of:
    determining that the fuel level in the first fuel tank is below the minimum allowable fuel level; and
    controlling the fuel tank arrangement to allow return flow from the prime mover to the first fuel tank until the fuel level in the first fuel tank exceeds the minimum allowable fuel level.

3. The method according to claim 1, further comprising the steps of:
    determining a maximum allowable fuel level within the second fuel tank; and
    controlling the fuel tank arrangement to allow return flow from the prime mover to the first fuel tank until the fuel level in the second fuel tank falls below the maximum allowable fuel level.

4. The method according to claim 3, further comprising the step of:
    controlling the second fuel tank to deliver fuel to the prime mover.

5. The method according to claim 1, wherein the first and second fuel tanks comprise a respective first and second fuel pump for providing fuel to the prime mover, wherein the method further comprises the steps of:
    determining a fuel level within the first fuel tank;
    comparing the fuel level with the minimum allowable fuel level; and
    controlling the pump power of the first fuel pump based on a difference between the fuel level in the first fuel tank and the minimum allowable fuel level.

6. The method according to claim 1, wherein the minimum allowable fuel level is based on a fuel level sufficient to maintain drivability of the prime mover for a first period of time.

7. The method according to claim 1, wherein the minimum allowable fuel level is based on a distance to a service station for the maintenance event.

8. The method according to claim 7, wherein the step of determining the minimum allowable fuel level within the first tank comprises the steps of:
    determining a distance to the service station;
    determining a volume of fuel for propelling the vehicle to the service station; and
    setting the volume of fuel as the minimum allowable fuel level within the first fuel tank.

9. The method according to claim 7, wherein the step of controlling a pump power of the first fuel pump is further based on the distance to the service station for the maintenance event.

10. The method according to claim 1, wherein the fuel tank arrangement further comprises a first return conduit arranged between the prime mover and the first fuel tank, the first return conduit comprising a first return valve controllable between an opened position and a closed position for controlling return flow into the first fuel tank.

11. A fuel tank arrangement for a vehicle, the fuel tank arrangement comprising a first and a second fuel tank connectable to a prime mover of the vehicle, a first fuel conduit connectable between the first fuel tank and the prime mover, wherein the first fuel conduit comprises a first fuel pump; a first return conduit connectable between prime mover and the first fuel tank, wherein the first return conduit comprises a first return valve; and a control unit connected to the first fuel pump and the first return valve, wherein the control unit is configured to:
  receive a signal indicative of an upcoming maintenance event for the first fuel tank;
  determine a fuel level within the first fuel tank;
  determine a minimum allowable fuel level within the first fuel tank; if the fuel level in the first fuel tank is above the minimum allowable fuel level:
  control the first fuel pump to deliver fuel from the first fuel tank to the prime mover; and
  control the return valve to be positioned in a closed state for preventing return flow from the prime mover to the first fuel tank.

12. The fuel tank arrangement according to claim 11, further comprising a second fuel conduit connectable between the second fuel tank and the prime mover, wherein the second fuel conduit comprises a second fuel pump, and a second return conduit connectable between the prime mover and the second fuel tank, wherein second return conduit comprises a second return valve, wherein the control unit is further connected to the second fuel pump and the second return valve.

13. For a fuel tank arrangement connected to a prime mover for propulsion of a vehicle, wherein the fuel tank arrangement comprises a first and a second fuel tank, the first and second fuel tanks being connected to the prime mover of the vehicle for delivery of fuel to the prime mover and for receiving return flow from the prime mover, a non-transitory computer-readable storage medium comprising a computer program product including instructions to cause at least one processor to:
  receive a signal indicative of an upcoming maintenance event for the first fuel tank;
  determine a minimum allowable fuel level within the first fuel tank;
  if a fuel level in the first fuel tank is above the minimum allowable fuel level:
    control at least the first fuel tank to deliver fuel to the prime mover; and
    control the fuel tank arrangement to prevent the return flow from the prime mover to the first fuel tank; and
  if the fuel level in the first fuel tank is below the minimum allowable fuel level:
    control the fuel tank arrangement to allow the return flow from the prime mover to the first fuel tank until the fuel level in the first fuel tank exceeds the minimum allowable fuel level.

14. The non-transitory computer-readable storage medium of claim 13 wherein the instructions are further configured to cause the at least one processor to:
  determine a maximum allowable fuel level within the second fuel tank; and
  control the fuel tank arrangement to allow the return flow from the prime mover to the first fuel tank until the fuel level in the second fuel tank falls below the maximum allowable fuel level.

15. The non-transitory computer-readable storage medium of claim 14 wherein the instructions are further configured to cause the at least one processor to control the second fuel tank to deliver the fuel to the prime mover.

16. The non-transitory computer-readable storage medium of claim 13 wherein the first and second fuel tanks comprise a respective first and second fuel pump for providing the fuel to the prime mover and wherein the instructions are further configured to cause the at least one processor to:
  determine the fuel level within the first fuel tank;
  compare the fuel level with the minimum allowable fuel level; and
  control a pump power of the first fuel pump based on a difference between the fuel level in the first fuel tank and the minimum allowable fuel level.

17. The non-transitory computer-readable storage medium of claim 13 wherein the minimum allowable fuel level is based on a fuel level sufficient to maintain drivability of the prime mover for a first period of time.

18. The non-transitory computer-readable storage medium of claim 13 wherein the minimum allowable fuel level is based on a distance to a service station for a maintenance event.

* * * * *